(12) United States Patent
Krishmamurthy et al.

(10) Patent No.: US 8,805,877 B2
(45) Date of Patent: Aug. 12, 2014

(54) USER-GUIDED REGULAR EXPRESSION LEARNING

(75) Inventors: Rajasekar Krishmamurthy, Campbell, CA (US); Yunyao Li, San Jose, CA (US); Sriram Raghavan, San Jose, CA (US); Shivakumar Vaithyanathan, Sunnyvale, CA (US)

(73) Assignee: International Business Machines Corporation, Armonk, NY (US)

(*) Notice: Subject to any disclaimer, the term of this patent is extended or adjusted under 35 U.S.C. 154(b) by 943 days.

(21) Appl. No.: 12/369,216

(22) Filed: Feb. 11, 2009

(65) Prior Publication Data
US 2010/0205201 A1    Aug. 12, 2010

(51) Int. Cl.
*G06F 7/00* (2006.01)
*G06F 17/30* (2006.01)

(52) U.S. Cl.
CPC .... *G06F 17/30985* (2013.01); *G06F 17/30648* (2013.01)
USPC .......................................... 707/776; 707/766

(58) Field of Classification Search
CPC ..................... G06F 17/30985; G06F 17/30648
USPC .................................................. 707/776, 766
See application file for complete search history.

(56) References Cited

U.S. PATENT DOCUMENTS

| | | | |
|---|---|---|---|
| 6,678,681 B1 | 1/2004 | Brin | |
| 6,842,796 B2 | 1/2005 | Zweig et al. | |
| 7,093,231 B2 * | 8/2006 | Nuss ............................. | 717/114 |
| 7,269,545 B2 | 9/2007 | Agichtein et al. | |
| 2003/0217052 A1 * | 11/2003 | Rubenczyk et al. .............. | 707/3 |
| 2005/0097514 A1 * | 5/2005 | Nuss ............................ | 717/114 |
| 2005/0261889 A1 * | 11/2005 | Iwakura ........................... | 704/4 |
| 2006/0085389 A1 * | 4/2006 | Flanagan et al. .................. | 707/2 |
| 2008/0034427 A1 * | 2/2008 | Cadambi et al. ................ | 726/22 |
| 2008/0071781 A1 * | 3/2008 | Ninan et al. .................... | 707/6 |
| 2008/0177712 A1 * | 7/2008 | Balasubramanian ............. | 707/3 |

OTHER PUBLICATIONS

Li et al.: "Regular Expression Learning for Information Extraction", Proceedings of the 2008 Conference on Empirical Methods in Natural Language Processing, pp. 21-30, Honolulu, Oct. 2008.*
Hanisch et al. "ProMiner: rule-based protein and gene entity recognition", BMC Bioinformatics, May 2005.*
Henning Fernau, "Algorithms for Learning Regular Expressions", 2005.*
Blockeel et al., "Information Extraction from Web Documents Based on Local Unranked Tree Automaton Inference" IJAI, 2003, pp. 403-408, Morgan Kaufman, United States.
Wikipedia, ("Regular Expression") [online]; [retrieved on Jun. 30, 2008]; retrieved from the Internet http://en.wikipedia.org/wiki/Regular_expression.

* cited by examiner

*Primary Examiner* — Shew-Fen Lin
(74) *Attorney, Agent, or Firm* — Cantor Colburn LLP; Yusuke Kanehira (57) ABSTRACT

A method, device, and computer program product are provided for regular expression learning is provided. An initial regular expression may be received from a user. The initial regular expression is executed over a database. Positive matches and negative matches are labeled. The initial regular expression and the labeled positive and negative matches are input in a transformation process. The transformation process may iteratively execute character class restrictions, quantifier restrictions, negative lookaheads on the initial regular expression to transform the initial regular expression into the pool of candidate regular expressions. The transformation process may execute, one at a time, the character class restrictions, quantifier restrictions, the negative lookaheads. A candidate regular expression is selected from the pool of candidate regular expressions, where the selected candidate regular expression has a best F-Measure out of the pool of candidate regular expressions.

17 Claims, 5 Drawing Sheets

Conventional Method to Develop Regular Expression (Regex) for Information Extraction

USER-GUIDED REGULAR EXPRESSION LEARNING

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

Exemplary embodiments relate to regular expression learning and particularly to techniques for improving regular expressions.

Figure 1:
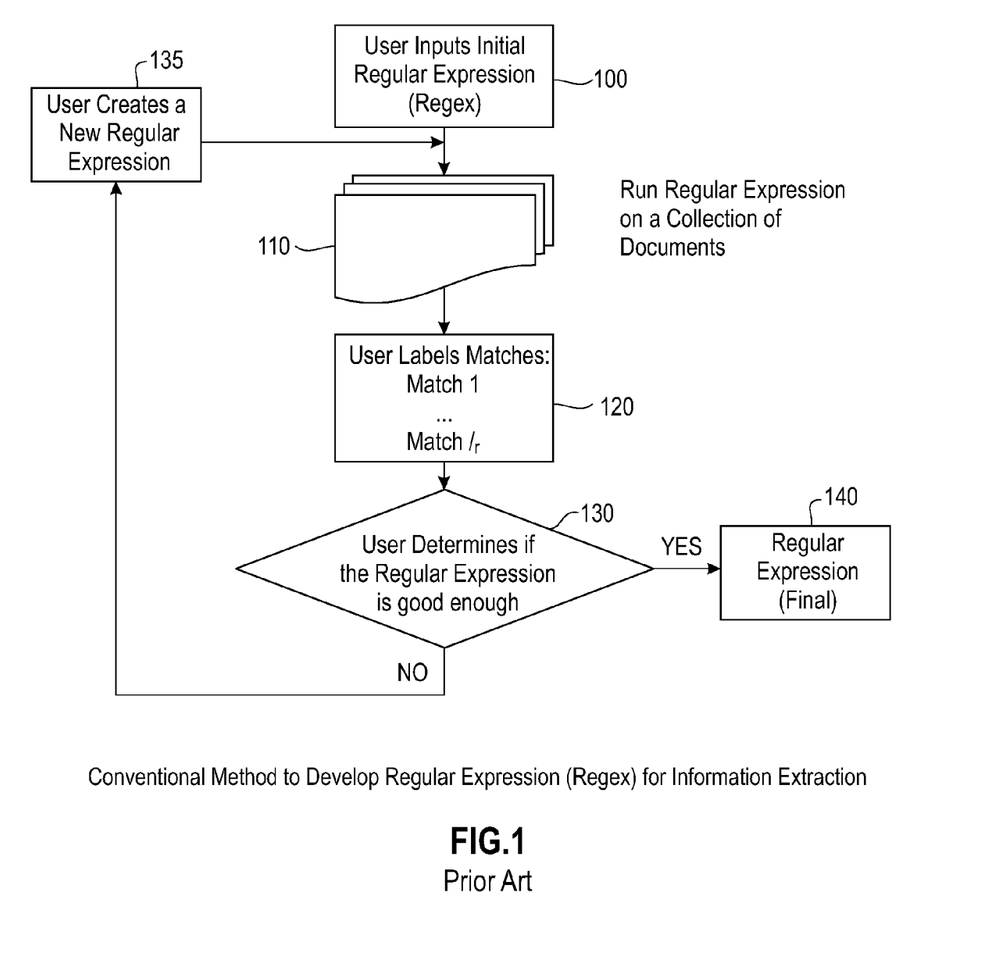
FIG. 1 illustrates a conventional way to develop regular expression for information extraction.

Regular expressions have served as the workhorse of information extraction (IE) systems for several years. FIG. 1 illustrates an example of a conventional way to develop regular expression (regrex) for information extraction. A user inputs a regular expression (regex) at 100. The regular expression is run on a collection of documents at 110. The user labels match 1 through match $1_r$ at 120.

The user determines if the regular expression is good enough at 130. If the regular expression is satisfactory to the user, the regular expression is final and the process ends at 140. If the regular expression is not satisfactory to the user, the user creates a new regular expression at 135 and the new regular expression is run.

This popularity of regular expression stems from the fact that regular expressions are sufficiently expressive, formally well-understood, and supported by a wide range of languages for describing textual patterns. However, despite this popularity, there has been very little work on reducing the manual effort involved in designing high-quality regular expressions for complex information extraction tasks.

SUMMARY OF EXEMPLARY EMBODIMENTS

In accordance with exemplary embodiments, a method for regular expression learning is provided. An initial regular expression may be received from a user. The initial regular expression is executed over a database. Positive matches and negative matches being labeled by a user are received, where the positive matches and the negative matches are results of executing the initial regular expression. The initial regular expression and the labeled positive and negative matches are input in a transformation process. A single iteration of the transformation process comprises executing a plurality of transformations on the current regular expression, where each of the transformations converts the current regular expression into a pool of candidate regular expressions. The transformation process may comprise executing a plurality of character class restrictions on the initial regular expression to transform the initial regular expression into a pool of candidate regular expressions, where the transformation process singularly executes each one of the plurality of character class restrictions on the initial regular expression until each of the plurality of character class restrictions are executed. Further, the transformation process may comprise executing a plurality of quantifier restrictions on the initial regular expression to transform the initial regular expression into the pool of candidate regular expressions, where the transformation process singularly executes each one of the plurality of quantifier restrictions on the initial regular expression until each of the plurality of quantifier restrictions are executed. Also, the transformation process may comprise executing a plurality of negative lookaheads on the initial regular expression to transform the initial regular expression into the pool of candidate regular expressions, where the transformation process singularly executes each one of the plurality of negative lookaheads on the initial regular expression until each of the plurality of negative lookaheads are executed. The transformation process may execute, one at a time, the plurality of character class restrictions, the plurality of quantifier restrictions, the plurality of negative lookaheads. A candidate regular expression is selected from the pool of candidate regular expressions, where the selected candidate regular expression has the best F-Measure out of the pool of candidate regular expressions and the F-Measure of the selected regular expression is better than the F-measure of the current regular expression. The selected regular expression becomes the current regular expression for the next iteration of the transformation process. The transformation process terminates when the current iteration does not produce a candidate regular expression with improved F-measure, in which the case the current regular expression is output as the final regular expression.

Computer program products and devices corresponding to the above-summarized methods are also described herein.

Additional features are realized through the techniques of exemplary embodiments. Exemplary embodiments of the invention are described in detail herein and are considered a part of the claimed invention. For a better understanding of features, refer to the description and to the drawings.

BRIEF DESCRIPTION OF THE SEVERAL VIEWS OF THE DRAWINGS

The subject matter of the disclosure is particularly pointed out and distinctly claimed in the claims at the conclusion of the specification. The foregoing and other features are apparent from the following detailed description taken in conjunction with the accompanying drawings in which:

The detailed description explains exemplary embodiments, together with features, by way of example with reference to the drawings.

DETAILED DESCRIPTION OF EXEMPLARY EMBODIMENTS

Exemplary embodiments provide techniques for user-guided regular expression learning. Exemplary embodiments may start with a broad regular expression (high recall). Then, using a small set of labeled examples, the system can successively refine the broad regular expression to produce a new regular repression in accordance with exemplary embodiments.

A large class of entity extraction tasks can be accomplished by the use of carefully constructed regular expressions. Examples of entities amenable to such extraction include phone numbers, URLs (uniform resource locator), email addresses, and software names. These entities share the characteristic that their key representative patterns (features) are expressible using the standard constructs of regular expressions. At first glance, it may seem that constructing a regular expression to extract an entity like a phone number is a fairly straightforward task. In reality, robust extraction requires fairly complex expressions, as illustrated below.

Note that throughout this disclosure, when listing regular expressions, we will use the syntax of the standard Java® regular expression engine but it is understood that exemplary embodiments are not limited to Java®.

Example 1

For phone number extraction, an apparent pattern for identifying phone numbers is "blocks of digits separated by hyphens" and this can be represented as $R_1=(\backslash d+\backslash-)+\backslash d+$.

In this expression, the group "\d+\-" matches a block of characters consisting of one or more digits followed by a hyphen. The quantifier "+" around this group indicates that one or more such blocks may appear sequentially. The last portion of the expression "\d+" matches another sequence of one or more digits. It is easy to see that $R_1$ matches valid phone numbers like 800-865-1125 and 725-1234. However, R1 suffers from both "precision" and "recall" problems. Not only does $R_1$ produce incorrect matches (e.g., a social security number such as 123-45-6789), it also fails to identify valid phone number instances, such as 800.865.1125 and (800) 865-CARE. An improved regular expression for phone numbers that addresses these problems is $R_2=(\backslash d\{3\}[-.\backslash()]) \{1,2\} [\backslash dA-Z]\{4\}$.

The process of generating such a complex regular expression is extremely laborious and human intensive. However, there has been very little work targeted towards reducing the human effort involved in building such extractors. Exemplary embodiments provide a learning formulation that can address the above problem and other issues, while demonstrating that high quality regular expression extractors can be automatically learned with significantly reduced human effort.

In accordance with exemplary embodiments, an application 260 can formulate a learning task for building complex high-quality regular expression extractors. Unlike existing formulations, we assume that the learning algorithm is provided with an initial regular expression in addition to labeled examples. This initial regular expression provides a natural mechanism for an expert to provide domain knowledge about the structure of the entity that is being extracted. Second, as we show below, the space of the output regular expressions under consideration can be meaningfully restricted by defining their relationship to the input expression. In accordance with exemplary embodiments, such an approach allows the search space to be restricted based on the domain knowledge of the user and customized for every extraction task. The approach in exemplary embodiments can be contrasted with existing work, where in existing work the search space was dictated purely by restrictions on the structural complexity of the target regular expressions.

Let $R_0$ denote the input regular expression provided by the user for the task of identifying instances of some entity E. Let $M(R_0, D)$ denote the set of matches obtained by evaluating $R_0$ over a document collection D. Let $M_p(R_0, D)=\{x \in M(R_0, D): x \text{ instance of } \epsilon\}$ and $M_n(R0, D)=\{x \in M(R0, D): x \text{ not an instance of } E\}$ denote the set of positive and negative matches for $R_0$ respectively. Note that a match is positive if the match corresponds to an instance of the entity of interest and is negative otherwise.

DEFINITION 1. For the task of extracting instances of an entity E, given $R_0$, $M_p(R_0, D)$, and $M_n(R_0, D)$, produce the "best" output regular expression $R_f$ that is "better" than $R_0$.

Below, we formalize what it means for $R_f$ to be "better" than $R_0$ at identifying instances of E and also what it means for $R_f$ to be the "best" such expression.

Next, exemplary embodiments cast the learning task introduced in the previous section into a cost-based optimization problem. First, we state reasonable assumptions to help define a tractable search space of regular expressions. Next, we introduce the concept of transformations to navigate through this search space. Then, we provide a description of the cost function that is used in the algorithm, in accordance with exemplary embodiments.

In accordance with exemplary embodiments, the input to our exemplary learning algorithm is an initial regular expression $R_0$ and the fully labeled set of positive and negative matches ($M_p(R_0, D)$ and $M_n(R_0, D)$) for $R_0$ over a document collection D. Given another candidate regular expression R, we must judge whether indeed R is a better extractor than $R_0$ for the same task. To make this judgment even for just the original document collection D, we must be able to label each instance matched by R (i.e., each element of M(R, D)) as positive or negative. This can be accomplished if the set of matches produced by R are contained within the set of available labeled examples, i.e., if $M(R, D) \subseteq M(R_0, D)$. From this observation, we make the following assumption:

ASSUMPTION 1. Given an input regular expression $R_0$ over some alphabet Σ, any other regular expression R over Σ is a candidate regular expression considered by our learning algorithm only if $L(R) \subseteq L(R_0)$. L(R) denotes the language accepted by R. Although the exemplary learning algorithm is described herein for illustrative purposes, it is understood that exemplary embodiments are not meant to be limited.

To understand what this assumption means in practice, let us revisit our earlier phone number example. Let the regular expression $R_1$ described in Example 1 be the input regular expression provided to our learning algorithm. Consider two candidate regular expressions: $R_3=(\backslash d\{3\}\backslash-)\{1,2\}\backslash d\{4\}$ and $R_4=[xX]\backslash d\{4,5\}$. $R_3$ is obtained by replacing each open-ended quantifier (the +'s) in $R_1$ with corresponding restricted range quantifiers such as "\d{3}" and "\d{4}". Therefore, it can be seen that $L(R_3) \subset L(R1)$ and thus $R_3$ is a potential candidate regular expression for our learning algorithm. On the other hand, $R_4$ is a drastically different expression from R1 and matches strings that begin with the character "x" (or "X") followed by a sequence of 4 to 5 digits. Indeed, $M(R_4, D)$ and $M(R_1, D)$ are disjoint sets and the presence of positive and negative labels for $M(R_1, D)$ does not allow us to judge how well $R_4$ performs. Thus, while $R_4$ is admittedly a reasonable regular expression for identifying extension phone numbers (such as x1456), in the absence of an input regular expression that includes such numbers in its space of matches, we do not treat $R_4$ as a candidate.

Even with the above assumption, we are left with a potentially infinite set of candidate regular expressions from which our learning task must choose one. To explore this set in a principled fashion, we need an "operator" that allows us to move from one element in this space to another, i.e., from one regular expression to another. Exemplary embodiments will apply transformations discussed below.

DEFINITION 2 (Transformation). Let $R_\Sigma$ denote the set of all regular expressions over some alphabet Σ. A transformation is a function $T: R_\Sigma \rightarrow 2^{R_\Sigma}$ such that $\forall R' \in T(R)$, $L(R') \subseteq L(R)$.

As an example, $R_1=(\backslash d+\backslash-)\{1,2\}\backslash d+$, can be transformed by modifying the quantifier "+" to a more restrictive range.

Applying this transformation to $R_1$ results in a set of regular expressions that includes $R_5$=(\d+\-){1, 2}\d{4} and $R_6$=(\d{3}\-){1, 2}\d+. Notice how $R_5$ and $R_6$ are obtained by transforming different occurrences of the quantifier "+" in $R_1$ with specific ranges. We discuss the above transformation (Quantifier Restriction) and others in great detail herein. For the present, it is sufficient to view a transformation as a function applied to a regular expression R that produces, as output, a set of regular expressions all of which accept sublanguages of L(R).

Given a set of such transformations T={$T_1, T_2, \ldots, T_n$}, let T(R) denote the set of all regular expressions obtained by (repeatedly) applying the transformations in T to R. The set of regular expressions that can be produced from the input regular expression in this fashion defines the search space of our learning algorithm in accordance with exemplary embodiments.

DEFINITION 3 (Search Space). Given an input regular expression $R_0$, the search space of a learning algorithm that employs a transformation set T is T ($R_0$).

For instance, since $R_3$=(\d{3}\-){1,2}\d{4} can be produced by applying the QuantifierRestriction transformation twice to $R_1$, $R_3$ is within the search space of our learning algorithm, given $R_1$ as input.

Let $M_p(R, D)$ denote the set of positive matches of a regular expression R, and let $M_n(R, D)$) denote the set of negative matches of the regular expression R. As a result of Assumption 1, we know that any regular expression in the search space of our learning algorithm will only produce a subset of the matches produced by the original input regular expression $R_0$. Thus, for any R∈T(R0), $$M_p(R,D)=M(R,D) \cap M_p(R_0,D),$$

$$M_n(R,D)=M(R,D) \cap M_n(R_0,D).$$

Based on this, we can further define $$\text{precision}(R, D) = \frac{M_p(R, D)}{M_p(R, D) + M_n(R, D)},$$

$$\text{recall}(R, D) = \frac{M_p(R, D)}{M_p(R_0, D)},$$

$$F(R, D) = \frac{2 \cdot \text{precision}(R, D) \cdot \text{recall}(R, D)}{\text{precision}(R, D) + \text{recall}(R, D)}.$$

F(R, D) represents the well-known F-measure and can be viewed as a single number that represents the extraction quality of R over document collection D. In our learning algorithm, we use this F-measure as the cost-function to compare two regular expressions in the search space.

Having defined a search space and a cost function, the regular expression learning task introduced earlier can now be restated as the following optimization problem:

DEFINITION 4 (Problem Statement). Given an input regular expression $R_0$, a document collection D, fully labeled sets of positive and negative labeled examples $M_p(R_0, D)$ and $M_n(R_0, D)$, and a set of transformations T, compute $$R_f = \text{argmax } F(R,D),$$

$$R \in T(R_0).$$

Exemplary embodiments further present two specific transformation classes and describe how they can be applied by exploiting the syntactic constructs of modern regular expression engines.

To formally define these transformation classes, we introduce two operations on a regular expression, e.g., a drop-disjunct and include-intersect. Both operations isolate a sub-expression of a given regular expression and modify that sub-expression in a specific way. In drop-disjunct, we look for a sub-expression that corresponds to a disjunct and drop one or more operands of that disjunct. In include-intersect, the chosen sub-expression is restricted by intersecting it with some other regular expression.

DEFINITION 5 (Drop-disjunct Operation). Let ρ(S) denote the disjunction $R_1|R_2 \ldots |R_n$ of any non-empty set of regular expressions S={$R_1|, R_2|, \ldots, R_n$}. Let R∈$R_\Sigma$ be a regular expression of the form R=$R_a$ρ(X)$R_b$ for some X⊆$R_\Sigma$ and X≠∅. The drop-disjunct operation DD(R, X, Y) for some Y⊂X, Y≠∅ is the new regular expression $R_a$ρ(Y)$R_b$.

DEFINITION 6 (Include-Intersect Operation). Let R∈$R_\Sigma$ be a regular expression of the form R=$R_a$ρ(X)$R_b$ for some X⊆ $R_\Sigma$ and X≠∅. The include-intersect operation II(R, X, Y) for some Y∈$R_\Sigma$, Y≠∅ is the new regular expression $R_a$(X∩Y) $R_b$.

For example, given R=a(b*|c+|d)e, X={b*,c+,d}, Y={c+}, and Y'={bbb, fff}, we have:

$$DD(R, X, Y) = a(c+)e$$

$$II(R, X, Y') = a(\{b^*|c+|d\} \cap \{bbb, fff\})e$$
$$= a(bbb)e$$

PROPOSITION 1. Given regular expressions R, $X_1, Y_1, X_2$ and $Y_2$ from $R_\Sigma$ such that DD(R, $X_1, Y_1$) and II(R, $X_2, Y_2$) are applicable, L(DD(R, $X_1$, $Y_1$))⊆L(R) and L(II(R, $X_2$, $Y_2$))⊆L(R).

Since the proposition guarantees that both drop-disjunct and include-intersect restrict the language of the resulting regular expression, the following two transformations are indeed valid.

DEFINITION 7 (DROP-DISJUNCT TRANSFORMATION). Let R∈$R_\Sigma$ be a regular expression of the form R=$R_a$ρ(X)$R_b$ for some X⊆$R_\Sigma$ and X=∅. Then {DD(R,X,Y)|Y⊂X, Y=∅} is called a drop-disjunct transformation of R.

DEFINITION 8 (INCLUDE-INTERSECT TRANSFORMATION). Let R∈$R_\Sigma$ be a regular expression of the form R=$R_a$X$R_b$ for some X∈$R_\Sigma$, X≠∅. Then {II(R, X, Y)|Y∈$R_\Sigma$, Y≠∅} is called an include-intersect transformation of R.

Notice that the abstract transformations described in DEFINITIONS 7 and 8 depend on a particular factorization of the input regular expression (e.g., a factorization of R as $R_a$ρ(X) $R_b$). In general, there may be multiple possible factorizations of a regular expression and correspondingly multiple ways in which these transformations may be applied. Below, we describe how the syntactic structure of a regular expression, can be exploited to guide the application of these transformations in accordance with exemplary embodiments.

In particular, we consider three syntactic constructs that can be widely supported by most regular expression engines: character classes, quantifiers, and negative lookahead. We propose corresponding transformations called character class restrictions, quantifier restrictions, and negative dictionaries. The first two transformations are instances of drop-disjunct and the last transformation is an instance of include-intersect. Note that other constructs and transformations are also possible. The particular choices that we have made are based on what we have found to be useful when applying our learning algorithm to several extraction tasks.

To aid in the description of these transformations, in addition to Example 1, we introduce the following extraction task:

Example 2

Software Name Extraction

The goal is to construct a regular expression to extract names of software products. A simple pattern for this task is: "one or more capitalized words followed by a version number". This description translates into the following regular expression $R_7$: ([A-Z]\w*\s*)+[Vv]?(\d+\.?)+). When applied to a collection of University web pages, we discovered that $R_7$ identified correct instances such as Netscape 2.0, Eclipse 3.2 and Installation Designer v1.1. However, $R_7$ also extracted incorrect instances such as course numbers (ENGLISH 317), room numbers (Room 330), and section headings (Chapter 2.2).

Character class restrictions: Character classes are shorthand notations for denoting the disjunction of a set of characters. For example, \d is equivalent to (0|1 . . . 9), \w is equivalent to (a| . . . |z|A| . . . |Z|0|1 . . . |9|_), and is equivalent to disjunction of all the characters. As a result, character classes are candidates for applying the drop-disjunct transformation in accordance with exemplary embodiments.

Figure 3:
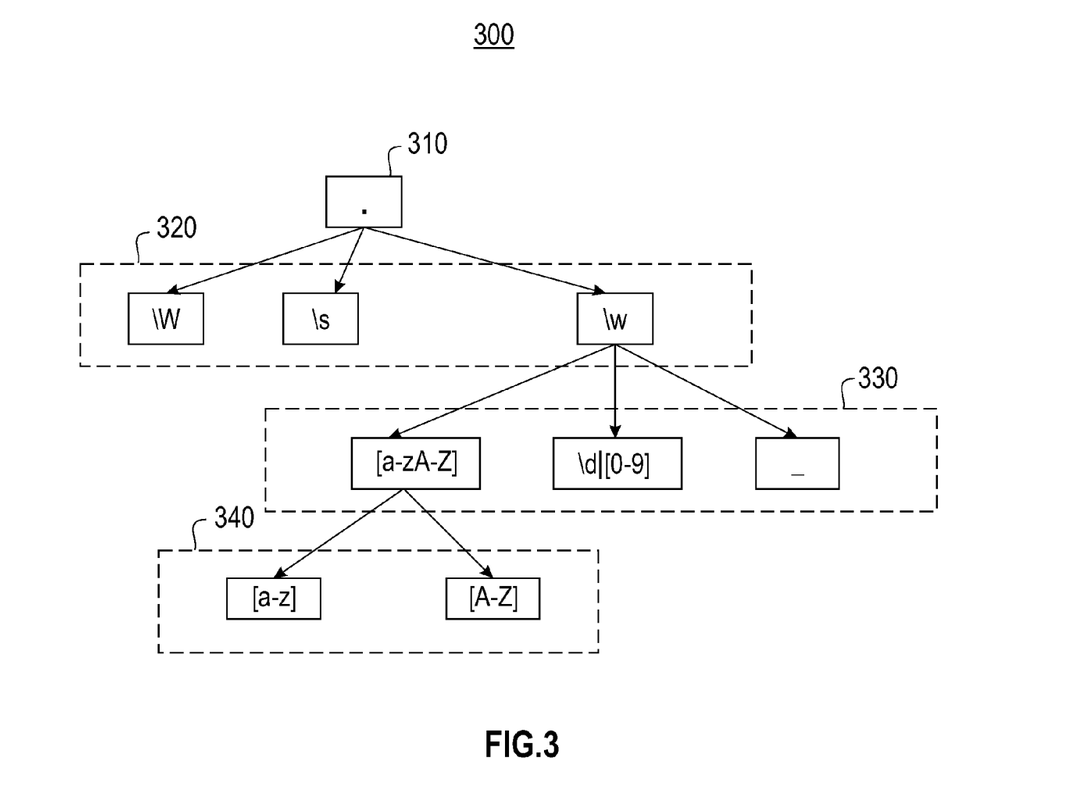
FIG. 3 illustrates an example hierarchy arrangement of character classes in accordance with exemplary embodiments.

FIG. 3 illustrates an example hierarchy arrangement 300 of character classes in accordance with exemplary embodiments. Arrangement 300 illustrates how character classes can be arranged into a hierarchy in which each node is a stricter class than its parent (e.g., \d is stricter than \w). Block 310 represents any character, and boxes 320, 330, and 340 each represent a stricter character class than its parent. For a regular expression that contains one of these character classes, the replacement of that class by any of its descendant classes is a valid application of drop-disjunct. We refer to such transformations as character class restrictions.

To illustrate this transformation, consider $R_7$ in Example 2. This expression can be improved by enforcing the condition that "each word has to be an upper-case letter followed by a sequence of one or more lower-case letters" (thereby eliminating spurious instances such as ENGLISH 317). To enforce this condition, we use an instance of character class restriction where ([A-Z]\w*\s*)+ is transformed to ([A-Z][a-z]*\s*)\+.

Quantifier restrictions: Quantifiers are used to define the range of valid counts of a repetitive sequence. For example, a{m,n} looks for a sequence of a's of length at least m and at most n. Also, a{m}, a+, and a* are equivalent to a{m,m}, a{1,∞}, and a{0,∞}, respectively. It is easy to see that quantifiers are also compact notations for denoting disjunctions and therefore amenable to drop-disjunct: we can replace an expression of the form R{m, n} with any expression R{$m_1$, $n_1$} such that $m_1 \geq m$ and $n_1 \leq n$. We refer to such transformations as quantifier restrictions. For example, a{1,3} is equivalent to a|aa|aaa and the application of quantifier restriction yields the set of expressions a{1,1}, a{1,2}, a{2,2}, a{2,3}, and a{3,3}. Recalling the phone number extraction task in Example 1, it can be seen that $R_3$ can be produced from $R_1$ by applying three separate quantifier restrictions.

As a practical restriction, when applying this transformation, we replace all occurrences of the unbounded quantifiers a* or a+ by a{0, maxCount} and a{1, maxCount} respectively (maxCount is a user configured maximum length for the entity being extracted). We also note that generating factorizations for quantifiers is exponential and thus can be expensive. However, this potential complexity problem is not an issue for our particular case, as the upper bound of a quantifier is bound by maxCount, which may be a small finite number for information extraction tasks.

Negative dictionaries (by exploiting lookaheads): Lookaheads are special constructs that allow a sequence of characters to be checked for matches against a regular expression without the characters themselves being part of the match. Lookaheads come in two types, positive and negative. The complete details of this construct are not relevant here. Our interest is in a specific form of negative lookahead that is used to generate include-intersect transformations. Specifically, we are interested in expressions of the form (?! R1)R2 ("?!" represents the negative lookahead operator) that return matches of regular expression R2 but only if those matches do not also match R1. For example, (?! Room)\w+ matches any sequence of letters and digits except the string "Room". It can be seen that (?! R1)R2 is equivalent to the regular expression R1∩R2 and therefore a natural candidate for the application of the include-intersect transformation.

Our use of this transformation is to enforce a negative dictionary, i.e., a set of strings that we do not wish to match. The basic idea is that for each capturing group in the input regular expression R, we compile a negative dictionary by choosing one or more strings that correspond to the capturing group from the negative matches $M_n(R, D)$. For example, consider the portion of the regular expression $R_7$ in Example 2 that matches one or more capitalized words: ([A-Z]\w*\s*)+. Based on the negative matches, we identify that the strings Room and Chapter should be avoided. To incorporate this into the regular expression, a list of strings is compiled from the negative matches and a corresponding negative lookahead expression is added to the regular expression. Therefore, the corresponding segment of $R_7$ is modified to (?!(Room|Chapter))([A-Z]\w*\s*)+. The general procedure for compiling negative dictionaries and correctly applying the transformations is fairly involved and omitted in the interest of clarity.

Further, during the transformation process, it is understood that the restrictions illustrated herein (such as character class restrictions, quantifier restrictions, and negative dictionaries) are for illustrative purposes but are not meant to be limiting. It is understood by one skilled in the art that other restrictions may be utilized in the transformation process in accordance with exemplary embodiments.

A procedure ReLIE ($M_{tr}$, $M_{val}$, $R_0$, T) below describes an exemplary ReLIE algorithm for the problem laid out in Definition 4. The procedure provided below is for illustrative purposes only and is not meant to be limiting.

---

Procedure ReLIE ($M_{tr}$, $M_{val}$, $R_0$, T )

```
// M_tr: set of labeled matches used as training data
// Mval: set of labeled matches used as validation data
// R_0 : user-provided regular expression
// T : set of transformations
begin
    1. R_current = R_0
    2.     do {
    3.         for each transformation t_i ∈ T
    4.             Candidate_i = __ApplyTransformations(R_current, t_i)
    5.         let Candidates = ∪ Candidate_i
    6.         let R' = argmax_{R∈Candidates} F(R, M_tr)
    7.         if (F(R', M_tr) <= F(R_current, M_tr))
    8.             return R_current
    9.         if (F(R', M_val) < F(R_current, M_val)
```

-continued

Procedure ReLIE ($M_{tr}$, $M_{val}$, $R_0$, T )

| | |
|---|---|
| 10. | return $R_{current}$ |
| 11. | $R_{current} = R'$ |
| 12. | } while(true) |
| 13. | return $R_{current}$ |
| end | |

ReLIE is a greedy best-first search procedure that chooses, at every iteration, the regular expression with the highest F-measure. An iteration in ReLIE consists of:
  Applying every possible transformation on the current regular expression $R_{current}$ to enumerate a set of candidate regular expressions,
  From this candidate set, choosing the regular expression R' whose F-measure over the training data set is maximum.

ReLIE terminates when either of the following conditions is true: (i) there is no improvement in F-measure over the training set, (ii) there is a drop in F-measure by applying R' on the validation set. This use of both a training and validation set to control the progress of the algorithm is an important aspect of ReLIE, intended to reduce the effects of overfitting.

PROPOSITION 2 (RELIE TERMINATES). Given any valid set of inputs $M_{tr}$, $M_{val}$, $R_0$, and T, the ReLIE algorithm above terminates.

In each iteration, the F-measure of the "best" regular expression R' is strictly better than $R_{current}$. This implies that, R' eliminates at least one additional negative match compared to $R_{current}$. Therefore, the maximum number of iterations possible for the algorithm is $M_n(R_0, M_{tr})$.

Figure 4:
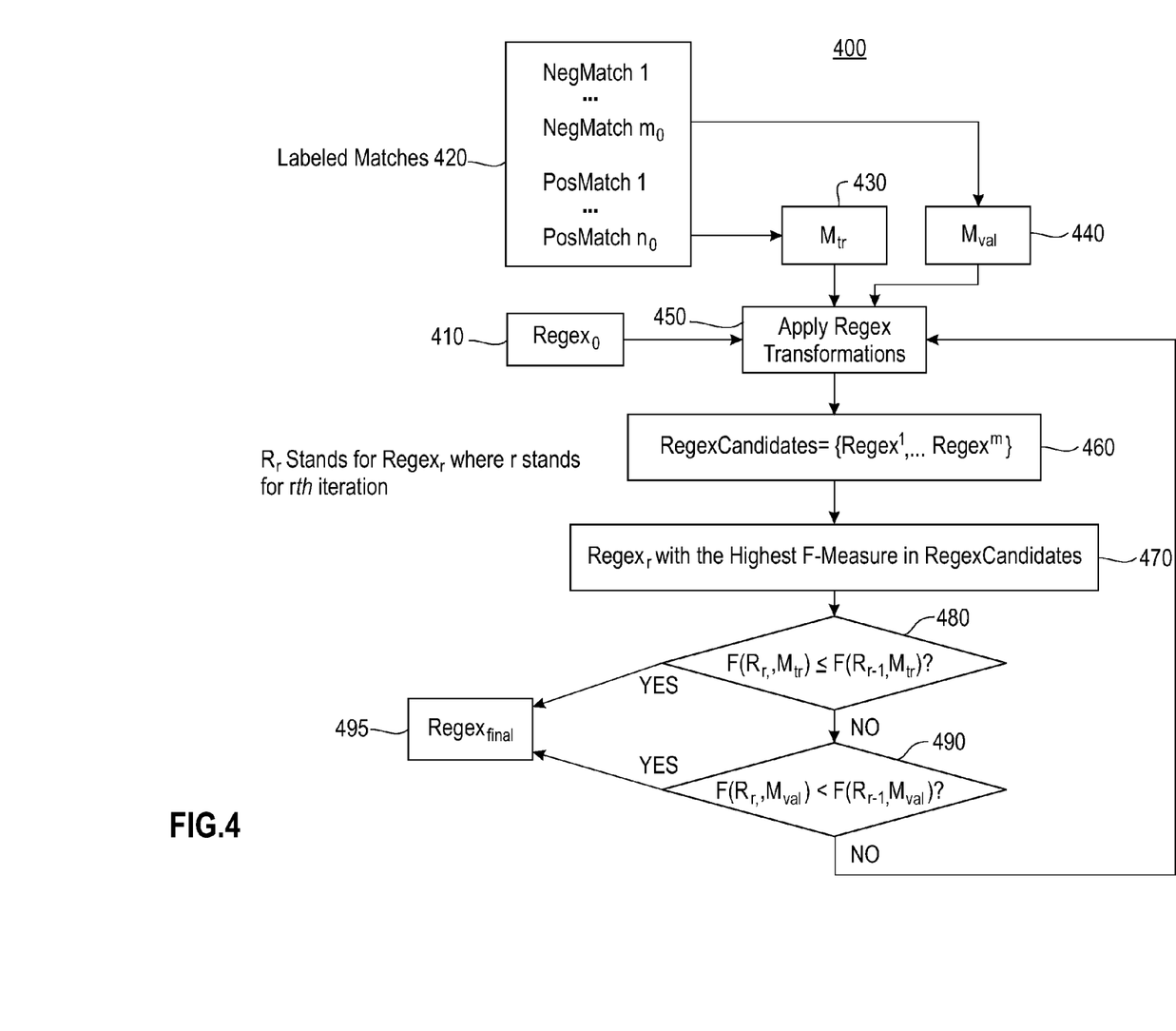
FIG. 4 illustrates a learning regular expression process for information extraction in accordance with exemplary embodiments.

FIG. 4 illustrates a learning regular expression process 400 for information extraction in accordance with exemplary embodiments.

$Regex_0$ 410 is a regular expression. For example, the regular expression may be created by a user. The regular expression $regex_0$ is input into a regex transformation at 450. Results of the $regex_0$ 410 may be labeled as a positive match or a negative match. For example, a user may label the results as positive or negative matches. The labeled matches 420 are input into $M_{tr}$ at 430 and $M_{val}$ at 440. $M_{tr}$ is a set labeled matches used as training data. $M_{val}$ is a set of labeled matches used as validation data. The $M_{tr}$ 430 and $M_{val}$ 440 are input into the regex transformation at 450. The application 260 is configured to execute the regrex transformation 450 to determine a new regular expression, and the output of the regrex transformation 450 is a set of transformed regular expressions (regexCandidates={$regex_1$, . . . , $regex_m$}) at 460.

Respectively, over the set of labeled matches used as training data ($M_{tr}$) and over the set of labeled matches used as validation data set ($M_{val}$), the F-Measure is determined for each of transformed regular expression in regexCandidates, and the F-measure is determined for the previous regular expression ($regex_{r-1}$) at 470. The transformed regular expression with the highest F-measure is output as $regex_r$. As discussed herein, the F-measure for a regular expression R over a document collection D may be computed using the F-measure equation F(R, D). The transformation process produces a pool of candidate regular expressions and the F-measure is computed for all the regular expressions in that set.

Based on the set of labeled matches ($M_{tr}$) used a training data, it is determined whether the F-measure for the transformed regular expression ($regex_r$) is better that the F-measure for the previous regular expression ($regex_{r-1}$) at 480.

In response to the F-measure for the transformed regular expression ($regex_r$) not being as good as (e.g., less than or equal to) the F-measure for the previous regular expression ($regex_{r-1}$) over the set of labeled matches ($M_{tr}$) used a training data, the previous regular expression is the final regular expression ($regex_{final}$) at 495.

In response to the F-measure for the transformed regular expression ($regex_r$) being better than (e.g., greater than) F-measure for the previous regular expression ($regex_{r-1}$) over the set of labeled matches ($M_{tr}$) used a training data, it is determined whether the F-measure for the transformed regular expression ($regex_r$) is better than the F-measure for the previous regular expression ($regex_{r-1}$) over the set of labeled matches used as validation data set ($M_{val}$) at 490.

In response to the F-measure for the transformed regular expression ($regex_r$) not being as good as (e.g., less than) the F-measure for the previous regular expression ($regex_{r-1}$), the previous regular expression is the final regular expression ($regex_{final}$) at 495. Otherwise, the regex transformation 450 is executed and the process continues. Moreover, the learning regular expression process is iterative in accordance with exemplary embodiments.

Figure 5:
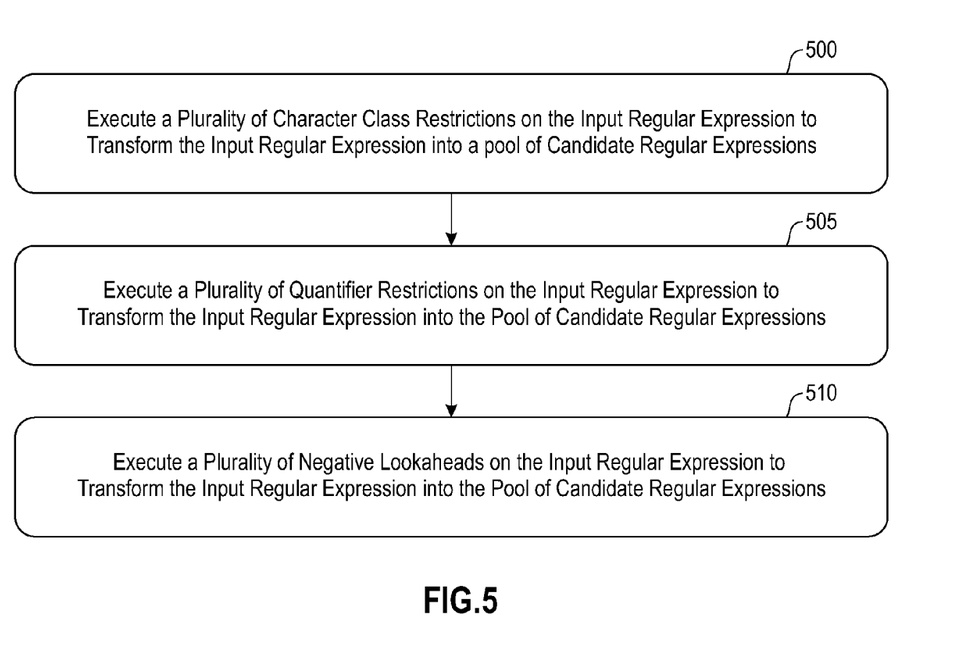
FIG. 5 illustrates a method for regular expression learning in accordance with exemplary embodiments.

FIG. 5 illustrates a method for applying regex transformation over an input regular expression in accordance with exemplary embodiments.

The transformation process may comprise executing a plurality of character class restrictions on the input regular expression to transform the input regular expression into a pool of candidate regular expressions, where the transformation process singularly executes each one of the plurality of character class restrictions on the input regular expression until each of the plurality of character class restrictions are executed at 500.

Further, the transformation process may comprises executing a plurality of quantifier restrictions on the input regular expression to transform the input regular expression into the pool of candidate regular expressions, where the transformation process singularly executes each one of the plurality of quantifier restrictions on the input regular expression until each of the plurality of quantifier restrictions are executed at 505.

Also, the transformation process may comprise executing a plurality of negative lookaheads on the input regular expression to transform the input regular expression into the pool of candidate regular expressions, where the transformation process singularly executes each one of the plurality of negative lookaheads on the input regular expression until each of the plurality of negative lookaheads are executed at 510.

The transformation process may execute, one at a time, the plurality of character class restrictions, the plurality of quantifier restrictions, the plurality of negative lookaheads. As described herein, the transformation process of the learning regular expression process is iterative in accordance with exemplary embodiments. Further, as discussed herein, the application 260 is configured to implement the operations of exemplary embodiments.

Figure 2:
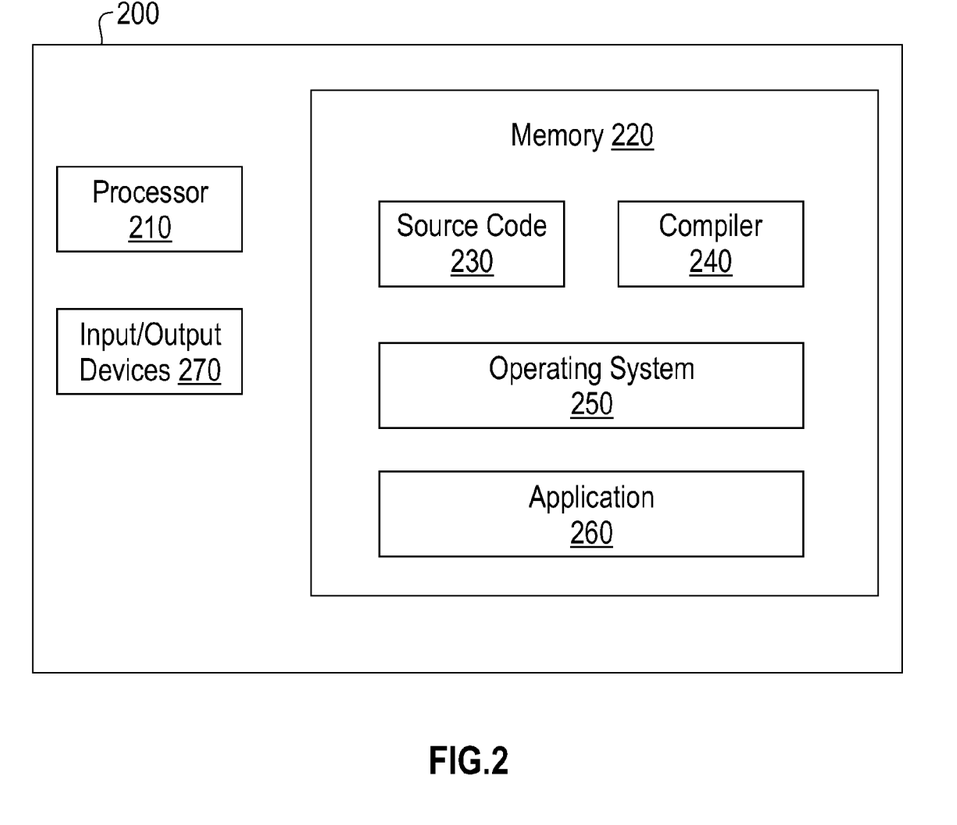
FIG. 2 illustrates an example computing device having capabilities, which may be utilized by exemplary embodiments.

FIG. 2 illustrates an example of a computing device 200 having capabilities, which may be utilized by exemplary embodiments. Various operations discussed herein may also utilize the capabilities of the computing device 200. One or more of the capabilities of the computing device 200 may be incorporated in any element, module, application, and/or component discussed herein.

The computing device 200 includes, but is not limited to, PCs, workstations, laptops, PDAs, palm devices, servers, storages, communication devices, and the like. Generally, in terms of hardware architecture, the computing device 200 may include one or more processors 210, memory 220, and one or more input and/or output (I/O) devices 270 that are communicatively coupled via a local interface (not shown).

The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 210 is a hardware device for executing software that can be stored in the memory 220. The processor 210 can be virtually any custom made or commercially available processor, a central processing unit (CPU), a data signal processor (DSP), or an auxiliary processor among several processors associated with the computing device 200, and the processor 210 may be a semiconductor based microprocessor (in the form of a microchip) or a macroprocessor.

The memory 220 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 220 may incorporate electronic, magnetic, optical, and/or other types of storage media. Note that the memory 220 can have a distributed architecture, where various components are situated remote from one another, but can be accessed by the processor 210.

The software in the memory 220 may include one or more separate programs, each of which comprises an ordered listing of executable instructions for implementing logical functions. The software in the memory 220 includes a suitable operating system (O/S) 250, compiler 240, source code 230, and application 260 in accordance with exemplary embodiments. As illustrated, the application 260 comprises numerous functional components for implementing the features and operations of the exemplary embodiments. The application 260 of the computing device 200 may represent various applications, computational units, logic, functional units, processes, operations, virtual entities, and/or modules in accordance with exemplary embodiments, but the application 260 is not meant to be a limitation.

The operating system 250 controls the execution of other computer programs, and provides scheduling, input-output control, file and data management, memory management, and communication control and related services. It is contemplated by the inventors that the application 260 for implementing exemplary embodiments may be applicable on all commercially available operating systems.

The application 260 may be a source program, executable program (object code), script, or any other entity comprising a set of instructions to be performed. When a source program, then the program is usually translated via a compiler (such as the compiler 240), assembler, interpreter, or the like, which may or may not be included within the memory 220, so as to operate properly in connection with the O/S 250. Furthermore, the application 260 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 270 may include input devices such as, for example but not limited to, a mouse, keyboard, scanner, microphone, camera, etc. Furthermore, the I/O devices 270 may also include output devices, for example but not limited to a printer, display, etc. Finally, the I/O devices 270 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 270 also include components for communicating over various networks, such as the Internet or intranet.

If the computing device 200 is a PC, workstation, intelligent device or the like, the software in the memory 220 may further include a basic input output system (BIOS) (omitted for simplicity). The BIOS is a set of essential software routines that initialize and test hardware at startup, start the O/S 250, and support the transfer of data among the hardware devices. The BIOS is stored in some type of read-only-memory, such as ROM, PROM, EPROM, EEPROM or the like, so that the BIOS can be executed when the computing device 200 is activated.

When the computing device 200 is in operation, the processor 210 is configured to execute software stored within the memory 220, to communicate data to and from the memory 220, and to generally control operations of the computing device 200 pursuant to the software. The application 260 and the O/S 250 are read, in whole or in part, by the processor 210, perhaps buffered within the processor 210, and then executed.

When the application 260 is implemented in software it should be noted that the application 260 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 260 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 260 is implemented in hardware, the application 260 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The capabilities of the present invention can be implemented in software, firmware, hardware or some combination thereof.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While exemplary embodiments to the invention had been described, it will be understood that those skilled in the art, both now and in the future, may make various improvements and enhancements which fall within the scope of the claims which follow. These claims should be construed to maintain the proper protection for the invention first described.

Additionally, at least one program storage device readable by a machine, tangibly embodying at least one program of instructions executable by the machine to perform the capabilities of the present invention can be provided.

What is claimed is:

1. A method for regular expression learning, comprising:
receiving an initial regular expression from a user;
executing the initial regular expression over a database;
receiving positive matches and negative matches being labeled by a user, wherein the positive matches and the negative matches are results of executing the initial regular expression;
inputting the initial regular expression and the labeled positive and negative matches in a transformation process, wherein the transformation process comprises:
executing a plurality of restrictions on the initial regular expression to transform the initial regular expression into a pool of candidate regular expressions, wherein the transformation process singularly executes each one of the plurality of restrictions on the initial regular expression until each of the plurality of restrictions is executed; and
selecting a candidate regular expression from the pool of candidate regular expressions, where the selected candidate regular expression has a best F-Measure out of the pool of candidate regular expressions;
wherein executing the plurality of restrictions for the transformation process comprises:
executing a plurality of character class restrictions on the initial regular expression to transform the initial regular expression into the pool of candidate regular expressions, wherein the transformation process singularly executes each one of the plurality of character class restrictions on the initial regular expression until each of the plurality of character class restrictions are executed;
executing a plurality of quantifier restrictions on the initial regular expression to transform the initial regular expression into the pool of candidate regular expressions, wherein the transformation process singularly executes each one of the plurality of quantifier restrictions on the initial regular expression until each of the plurality of quantifier restrictions are executed; and
executing a plurality of negative lookaheads on the initial regular expression to transform the initial regular expression into the pool of candidate regular expressions, wherein the transformation process singularly executes each one of the plurality of negative lookaheads on the initial regular expression until each of the plurality of negative lookaheads are executed;
wherein the transformation process executes, one at a time, the plurality of character class restrictions, the plurality of quantifier restrictions, the plurality of negative lookaheads.

2. The method of claim 1, wherein the F-Measure is determined for:
a set of labeled matches used as training data; and
a set of labeled matches used as validation data.

3. The method of claim, wherein executing the plurality of character class restrictions on the initial regular expression comprises iteratively restricting one or more character classes of the initial regular expression.

4. The method of claim, wherein executing the plurality of quantifier restrictions on the initial regular expression comprises iteratively restricting one or more quantifier restrictions of the initial regular expression.

5. The method of claim, wherein executing the plurality of negative lookaheads on the initial regular expression comprises checking for matches of characters against the initial regular expression such that the characters can be excluded.

6. The method of claim 2, wherein an F-Measure is determined for the entire pool of the pool of candidate regular expressions.

7. The method of claim 2, wherein selecting the candidate regular expression from the pool of candidate regular expressions with the best F-Measure comprises:

iteratively comparing the F-Measure of a current candidate regular expression to the F-Measure of a previous candidate regular expression for the set of labeled matches used as training data;

in response to the F-Measure of the previous candidate regular expression being better than the F-Measure of the current candidate regular expression for the set of labeled matches used as training data, outputting the previous candidate regular expression;

iteratively comparing the F-Measure of the current candidate regular expression to the F-Measure of the previous candidate regular expression for the set of labeled matches used as validation data; and in response to the F-Measure of the previous candidate regular expression being better than the F-Measure of the current candidate regular expression for the set of labeled matches used as validation data, outputting the previous candidate regular expression.

8. A computing device configured for regular expression learning comprising:

memory for storing a program for providing for regular expression learning; and a processor, functionally coupled to the memory, the processor being responsive to computer-executable instructions contained in the program and operative to:

receive an initial regular expression from a user;

execute the initial regular expression over a database;

receive labeled positive matches and negative matches from a user, wherein the positive matches and the negative matches are results of executing the initial regular expression;

input the initial regular expression and the labeled positive and negative matches in a transformation process, wherein the transformation process is an iterative process which comprises:

executing a plurality of restrictions on the initial regular expression to transform the initial regular expression into a pool of candidate regular expressions, wherein the transformation process singularly executes each one of the plurality of restrictions on the initial regular expression until each of the plurality of restrictions is executed; and select a candidate regular expression from the pool of candidate regular expressions, where the selected candidate regular expression has a best F-Measure out of the pool of candidate regular expressions;

wherein executing the plurality of restrictions for the transformation process comprises:

executing a plurality of character class restrictions on the initial regular expression to transform the initial regular expression into the pool of candidate regular expressions, wherein the transformation process singularly executes each one of the plurality of character class restrictions on the initial regular expression until each of the plurality of character class restrictions are executed;

executing a plurality of quantifier restrictions on the initial regular expression to transform the initial regular expression into the pool of candidate regular expressions, wherein the transformation process singularly executes each one of the plurality of quantifier restrictions on the initial regular expression until each of the plurality of quantifier restrictions are executed; and executing a plurality of negative lookaheads on the initial regular expression to transform the initial regular expression into the pool of candidate regular expressions, wherein the transformation process singularly executes each one of the plurality of negative lookaheads on the initial regular expression until each of the plurality of negative lookaheads are executed;

wherein the transformation process executes, one at a time, the plurality of character class restrictions, the plurality of quantifier restrictions, the plurality of negative lookaheads.

9. The device of claim 8, wherein the F-Measure is determined based on at least one of:

a set of labeled matches used as training data; and a set of labeled matches used as validation data.

10. The device of claim 8, wherein executing the plurality of character class restrictions on the initial regular expression comprises iteratively restricting one or more character classes of the initial regular expression.

11. The device of claim 8, wherein executing the plurality of quantifier restrictions on the initial regular expression comprises iteratively restricting one or more quantifier restrictions of the initial regular expression.

12. The device of claim 8, wherein executing the plurality of negative lookaheads on the initial regular expression comprises checking for matches of characters against the initial regular expression such that the characters can be excluded.

13. The device of claim 9, wherein selecting the candidate regular expression from the pool of candidate regular expressions with the best F-Measure is an iterative process which comprises:

iteratively comparing the F-Measure of a current candidate regular expression to the F-Measure of a previous candidate regular expression for the set of labeled matches used as training data;

in response to the F-Measure of the previous candidate regular expression being better than the F-Measure of the current candidate regular expression for the set of labeled matches used as training data, outputting the previous candidate regular expression;

iteratively comparing the F-Measure of the current candidate regular expression to the F-Measure of the previous candidate regular expression for the set of labeled matches used as validation data; and in response to the F-Measure of the previous candidate regular expression being better than the F-Measure of the current candidate regular expression for the set of labeled matches used as validation data, outputting the previous candidate regular expression.

14. A computer program product, tangibly embodied on a non-transitory computer readable medium, for regular expression learning, the computer program product including instructions for causing a computer to execute a method, comprising:

receiving an initial regular expression from a user;

executing the initial regular expression over a database;

receiving labeled positive matches and negative matches from a user, wherein the positive matches and the negative matches are results of executing the initial regular expression;

inputting the initial regular expression and the labeled positive and negative matches in a transformation process, wherein the transformation process comprises:

executing a plurality of restrictions on the initial regular expression to transform the initial regular expression into a pool of candidate regular expressions, wherein the transformation process singularly executes each one of the plurality of restrictions on the initial regular expression until each of the plurality of restrictions is executed;

selecting a candidate regular expression from the pool of candidate regular expressions, where the selected candidate regular expression has a best F-Measure out of the pool of candidate regular expressions;

wherein executing the plurality of restrictions for the transformation process comprises:

executing a plurality of character class restrictions on the initial regular expression to transform the initial regular expression into the pool of candidate regular expressions, wherein the transformation process singularly executes each one of the plurality of character class restrictions on the initial regular expression until each of the plurality of character class restrictions are executed;

executing a plurality of quantifier restrictions on the initial regular expression to transform the initial regular expression into the pool of candidate regular expressions, wherein the transformation process singularly executes each one of the plurality of quantifier restrictions on the initial regular expression until each of the plurality of quantifier restrictions are executed; and executing a plurality of negative lookaheads on the initial regular expression to transform the initial regular expression into the pool of candidate regular expressions, wherein the transformation process singularly executes each one of the plurality of negative lookaheads on the initial regular expression until each of the plurality of negative lookaheads are executed;

wherein the transformation process executes, one at a time, the plurality of character class restrictions, the plurality of quantifier restrictions, the plurality of negative lookaheads.

15. The computer program product of claim 14, wherein the F-Measure is determined based on at least one of:

a set of labeled matches used as training data; and a set of labeled matches used as validation data.

16. The computer program product of claim 14, wherein an F-Measure is determined for the entire pool of the pool of candidate regular expressions.

17. The computer program product of claim 15, wherein selecting the candidate regular expression from the pool of candidate regular expressions with the best F-Measure comprises:

iteratively comparing the F-Measure of a current candidate regular expression to the F-Measure of a previous candidate regular expression for the set of labeled matches used as training data;

in response to the F-Measure of the previous candidate regular expression being better than the F-Measure of the current candidate regular expression for the set of labeled matches used as training data, outputting the previous candidate regular expression;

iteratively comparing the F-Measure of the current candidate regular expression to the F-Measure of the previous candidate regular expression for the set of labeled matches used as validation data; and in response to the F-Measure of the previous candidate regular expression being better than the F-Measure of the current candidate regular expression for the set of labeled matches used as validation data, outputting the previous candidate regular expression.

* * * * *